United States Patent
Lior

(10) Patent No.: US 9,311,080 B2
(45) Date of Patent: Apr. 12, 2016

(54) INSTRUMENTED FILE DEPLOYMENT

(75) Inventor: Reuven Lior, Yehud (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/418,815

(22) PCT Filed: Jul. 31, 2012

(86) PCT No.: PCT/US2012/048978
§ 371 (c)(1),
(2), (4) Date: Jan. 30, 2015

(87) PCT Pub. No.: WO2014/021843
PCT Pub. Date: Feb. 6, 2014

(65) Prior Publication Data
US 2015/0154020 A1    Jun. 4, 2015

(51) Int. Cl.
*G06F 9/44*   (2006.01)
*G06F 9/445*  (2006.01)
*G06F 11/36*  (2006.01)

(52) U.S. Cl.
CPC .. *G06F 8/71* (2013.01); *G06F 8/33* (2013.01); *G06F 8/60* (2013.01); *G06F 8/73* (2013.01); *G06F 11/3624* (2013.01)

(58) Field of Classification Search
CPC ............... G06F 8/71; G06F 8/33; G06F 8/60
USPC ................................................ 717/122, 110
See application file for complete search history.

(56) References Cited

U.S. PATENT DOCUMENTS

| | | | |
|---|---|---|---|
| 5,987,249 A | 11/1999 | Grossman et al. | |
| 6,026,237 A | 2/2000 | Berry et al. | |
| 6,314,558 B1 | 11/2001 | Angel et al. | |
| 6,802,054 B2 | 10/2004 | Faraj | |
| 6,944,797 B1 | 9/2005 | Guthrie et al. | |
| 7,503,037 B2 | 3/2009 | Banerjee et al. | |
| 7,689,558 B2 | 3/2010 | Rossmann | |
| 8,856,725 B1 * | 10/2014 | Anderson et al. | 717/103 |
| 2002/0049963 A1 | 4/2002 | Beck et al. | |
| 2003/0101089 A1 * | 5/2003 | Chappel | G06Q 10/06 705/7.17 |
| 2006/0101418 A1 | 5/2006 | Barsness et al. | |
| 2006/0150150 A1 * | 7/2006 | Tiwari et al. | 717/110 |
| 2006/0200645 A1 * | 9/2006 | Kumar | G06F 8/36 712/1 |
| 2007/0136394 A1 * | 6/2007 | Cowan et al. | 707/203 |

(Continued)

OTHER PUBLICATIONS

Wloka et al., "Effectively Automate and Enforce Process Rules and Tasks when Delivering Changes" Oct. 30, 2008.*

(Continued)

*Primary Examiner* — Phillip H Nguyen
(74) *Attorney, Agent, or Firm* — Brooks, Cameron & Huebsch, PLLC

(57) ABSTRACT

Systems, methods, and machine-readable and executable instructions are provided for instrumented file deployment. Instrumented file deployment can include identifying a number of changes between a first artifact and a second artifact. Instrumented file deployment can also include identifying a number of class names and a number of method names within the second artifact where the changes reside. Instrumented file deployment can include creating an instrumented file from the identified number of class names and the identified number of method names. Instrumented file deployment can include deploying the second artifact and the instrumented file together.

20 Claims, 3 Drawing Sheets

(56) References Cited

U.S. PATENT DOCUMENTS

| | | | |
|---|---|---|---|
| 2008/0104581 A1* | 5/2008 | Clemm et al. | 717/162 |
| 2009/0037898 A1* | 2/2009 | Belisario | G06F 8/20 717/169 |
| 2010/0077380 A1* | 3/2010 | Baker et al. | 717/120 |
| 2011/0161913 A1 | 6/2011 | Garimella | |
| 2012/0030651 A1* | 2/2012 | Kemmler et al. | 717/124 |
| 2012/0130906 A1* | 5/2012 | Klinker et al. | 705/301 |
| 2012/0317075 A1* | 12/2012 | Pasumarthi et al. | 707/626 |
| 2013/0074038 A1* | 3/2013 | Fox et al. | 717/122 |
| 2013/0111441 A1* | 5/2013 | Clemm | G06F 8/72 717/121 |
| 2013/0174124 A1* | 7/2013 | Watters et al. | 717/122 |
| 2015/0040101 A1* | 2/2015 | Rummler | G06Q 10/101 717/113 |

OTHER PUBLICATIONS

Yu et al., "Traceability for the Maintenance of Secure Software", 2008.*

Singh, et al., "dynaTrace Continuous APM," Aug. 2009, Retrieved from http://static.progressivemediagroup.com/Uploads/Whitepaper/44/6ba51f38-6690-4468-bbc2-202965e2d28f.pdf, 8 pages.

Unknown., "Instrumenting Code," Feb. 2004, Retrieved from http://www.interhack.net/projects/vls/vls_7.html, 6 pages.

Korean Intellectual Property Office, International Search Report and Written Opinion, Mar. 29, 2013, 9 pages, Daejeon Metropolitan City, Republic of Korea.

Supplementary European Search Report, Dec. 1, 2015, European Patent Application No. 12882067.7, 7 pages.

* cited by examiner

INSTRUMENTED FILE DEPLOYMENT

PRIORITY APPLICATION INFORMATION

This application is a National Stage Application under 35 U.S.C. §371 of International Application Number PCT/US2012/048978, filed Jul. 31, 2012 and published as WO 2014/021843 on Feb. 6, 2014, the entire contents of which are incorporated herein by reference in its entirety.

BACKGROUND

Machine readable instructions (MRI) can be tested and/or deployed. The testing of MRI can reveal a number of errors. Errors can cause the MRI to malfunction and/or produce a number of exceptions.

DETAILED DESCRIPTION

Figure 1:
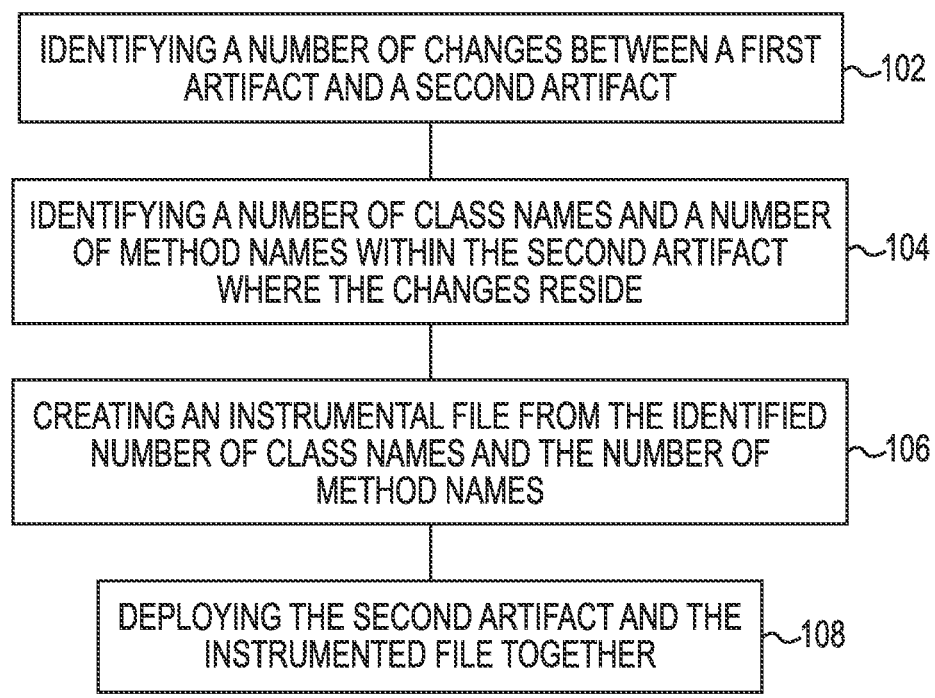
FIG. 1 is a flow chart illustrating an example of a method for instrumented file deployment according to the present disclosure.

A developer can introduce a number of changes into an artifact. The changes can create a number of versions of the artifact. The number changes to an artifact can be traced to the developer through an instrumented file that can include a number of class names and/or a number of method names where the changes took place within the artifact. Being able to track the changes of an artifact to a developer can allow information technology (IT) professionals not familiar with the artifacts to associate a class and/or a method within the artifact where an error occurred with a developer.

The maturity of a number of artifacts can include a number of phases. For example, the maturity of a number of artifacts can include a development phase and/or an operations phase, among other phases. A development phase can include a conception of an artifact and/or a creation of an artifact, among others. An operations phase of an artifact can include the testing of an artifact and/or the monitoring of an artifact. As used herein, an artifact can include machine readable instructions (MRI). For example, an artifact can include source code and/or compiled code.

In an effort to increase productivity, the different phases can be merged to try to increase efficiency. For example, an artifact can be developed and then tested. In testing, it can be discovered that an artifact includes a number of errors, e.g., bugs. An operations professional can identify the error and send the error to a development team that developed the artifact. The development team can then determine a developer that introduced the error into the code. The development team can then allow the developer to remedy the error. However, efficiency of remedying an error can be increased if the operations professional is able to identify the error and the developer that introduced the error into the artifact as compared to the operations professional having to rely on someone else to identify the developer. The operations professional can inform the developer of the error. The developer can remedy the error and produce a latest version of the artifact.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N" and "M", particularly with respect to reference numerals in the drawings, indicate that a number of the particular feature so designated can be included.

FIG. 1 is a flow chart illustrating an example of a method for instrumented file deployment according to the present disclosure. At 102, number of changes between a first artifact and a second artifact can be identified.

As used herein an artifact can include different types of artifacts. For example, an artifact can be an image artifact and/or a text artifact, among other types of artifacts. An artifact can be an object and/or a structure, for instance. An artifact can include, for example, a set of machine readable instructions (MRI). An artifact can be an executable file, for example. In the example used in FIG. 1, an artifact includes a number of classes and/or a number of methods. That is, artifacts can be structured into classes and the classes can be divided into methods. The classes and/or the methods can include MRI. In a number of examples of the present disclosure, the MRI included in an artifact can be written in a runtime programming language. Examples of a runtime programming language can include Java, .Net, PHP: Hypertext Preprocessor, and/or Python.

An artifact can further have associated metadata. Metadata can include a description of the artifact. For example, metadata of an artifact can describe the artifact by including a name of the artifact, a size of the artifact, and/or information regarding a history of the artifact. A history of an artifact can include when an artifact was changed, who made the changes, and what the changes entailed.

In the example used in FIG. 1, a first artifact and a second artifact can represent a first version and a second version, respectively, of a particular artifact. The first version of the particular artifact can be created when the particular artifact is modified. The second version of the particular artifact can be created when the particular artifact and/or the first version of the artifact is modified. In the example used in FIG. 1, the second artifact can be a latest version of the particular artifact. That is, the first artifact can be created before the second artifact. A subsequent artifact can be modified when the state of an artifact is changed. An artifact can be modified when, for example, a number of classes and/or methods are changed. Changing a number of classes and/or a number of methods can include adding and/or removing MRI from the number of classes and/or the number of methods. Changing the state of an artifact can also include adding a number of new classes and/or methods to a number of existing classes and/or methods in the artifact. Changing the state of an artifact can also include removing a number of existing classes and/or methods from the artifact.

Identifying a number of changes between the first artifact and the second artifact can include comparing the first artifact with the second artifact and identifying the differences between the two. For example, a number of lines of MRI can be added to the second artifact that are not included in the first artifact. In a number of examples of the present disclosure, identifying a number of changes between the first artifact and the second artifact can include comparing metadata associated with the first artifact and metadata associated with the second artifact to identify a number of changes.

At 104, a number of class names and a number of method names, within the second artifact where the changes reside, can be identified. For example, when a number of lines of MRI are added to the second artifact, it can be determined where those MRI reside. For example, the added MRI can reside within a specific class and/or a specific method. The specific class and/or the specific method can have an associated class name and/or an associated method name, respectively.

At 106, an instrumented file, including the identified number of class names and/or the identified number of method names, can be created. As used herein, an instrumented file can allow the performance of an artifact to be measured. In a number of examples, an instrumented file can be separate from an artifact. The instrumented file can be used to identify a number of MRI in an artifact. The identified number of MRI can then be monitored.

An instrumented file can be configured to function with a monitoring program. That is, an instrumented file can include a number of formats and is not limited to a particular format. The number of class names and/or method names within the instrumented file can be used to monitor a first artifact. For example, if an instrumented file includes a first class name, then a monitoring program can measure a number of aspects of an associated first class that resides within an artifact.

Monitoring an artifact can include monitoring a number of different aspects of the artifact. For example, an artifact can be monitored for faults, e.g., errors, that can occur during an execution of the artifact.

The performance of an artifact can also be monitored. Performance can include a measurement of efficiency and/or usage of resources, among other standards. For example, a measurement of a usage of a particular class in a second artifact can determine the processor resources used while executing the particular class as compared to the processor resources used to execute other classes in the second artifact. Furthermore, a measurement of efficiency of a particular class in a second artifact can be computed by comparing the resources used in a particular class in a second artifact as compared to the resources used in the particular class in a first artifact. For example, a particular class that is included in a first artifact can also be included in a second artifact with a few changes. The resources, e.g., first resources, used in executing the particular class in the first artifact can be compared to the resources, e.g., second resources, used to execute the particular class in the second artifact. The first resources and the second resources can be compared to determine the efficiency of the particular class in the second artifact as compared to the particular class in the first artifact.

A fault can be an unexpected result of the execution of MRI in an artifact. The source of an unexpected result of the execution of MRI can be introduced in a development phase. For example, the source of an unexpected result of the execution can be attributed to errors in the MRI that are the result of a poor design and/or incorrect syntax. Errors can further be introduced during a compiling phase and/or during the execution of the MRI. An example of a fault can include a memory leak and/or a run time exception, among others.

A fault can be discovered during development, testing, and/or deployment of an artifact. A fault can further be discovered by a developer, operations professional, and/or user, among others. A developer that is developing the artifact can find a solution to a fault when the developer discovers the fault because the developer has a working knowledge of the artifact and has access to the MRI in the artifact. However, in a number of examples of the present disclosure, an operations professional and/or user may not have a working knowledge of the artifact and/or may not have access to the MRI in the artifact and as a result may not be able to find a solution to the fault. The ability to identify a fault, where the fault occurred, and/or who can find a solution to the fault can be used to improve the development of an artifact.

The performance of an artifact can further be used in an evaluation of a developer. An evaluation of a developer can include evaluating the performance of a developer as it relates to the development of an artifact. For example, a fault in the artifact that could have been prevented by a developer can reflect negatively in the evaluation of a developer. A fault can be prevented when the source of the fault is introduced into an artifact by a developer and the introduction of the source violates a policy. A policy can be associated with a number of exemplary practices for introducing MRI into an artifact. Other standards can be established for associating the performance of an artifact with an evaluation of a developer.

At 108, the second artifact and the instrumented file can be deployed together. The instrumented file can be used to identify a developer. For example, during the monitoring of the second artifact, e.g., latest version of an artifact, a fault can be identified. The instrumented file can be used to determine where the fault occurred. For example, the instrumented file can be used to determine that the fault occurred in a class having a specific class name and/or a method having a specific method name. The class name and/or method name can be associated with a class and/or method in the second artifact. The class and/or method can be associated with a developer that developed the class and/or method. A report can be generated for the developer, the report can include the fault and the class name, method name, and/or developer responsible for the class and/or method. The report can be generated by an operations professional and/or a user who does not have access to the MRI in the artifact.

Figure 2:
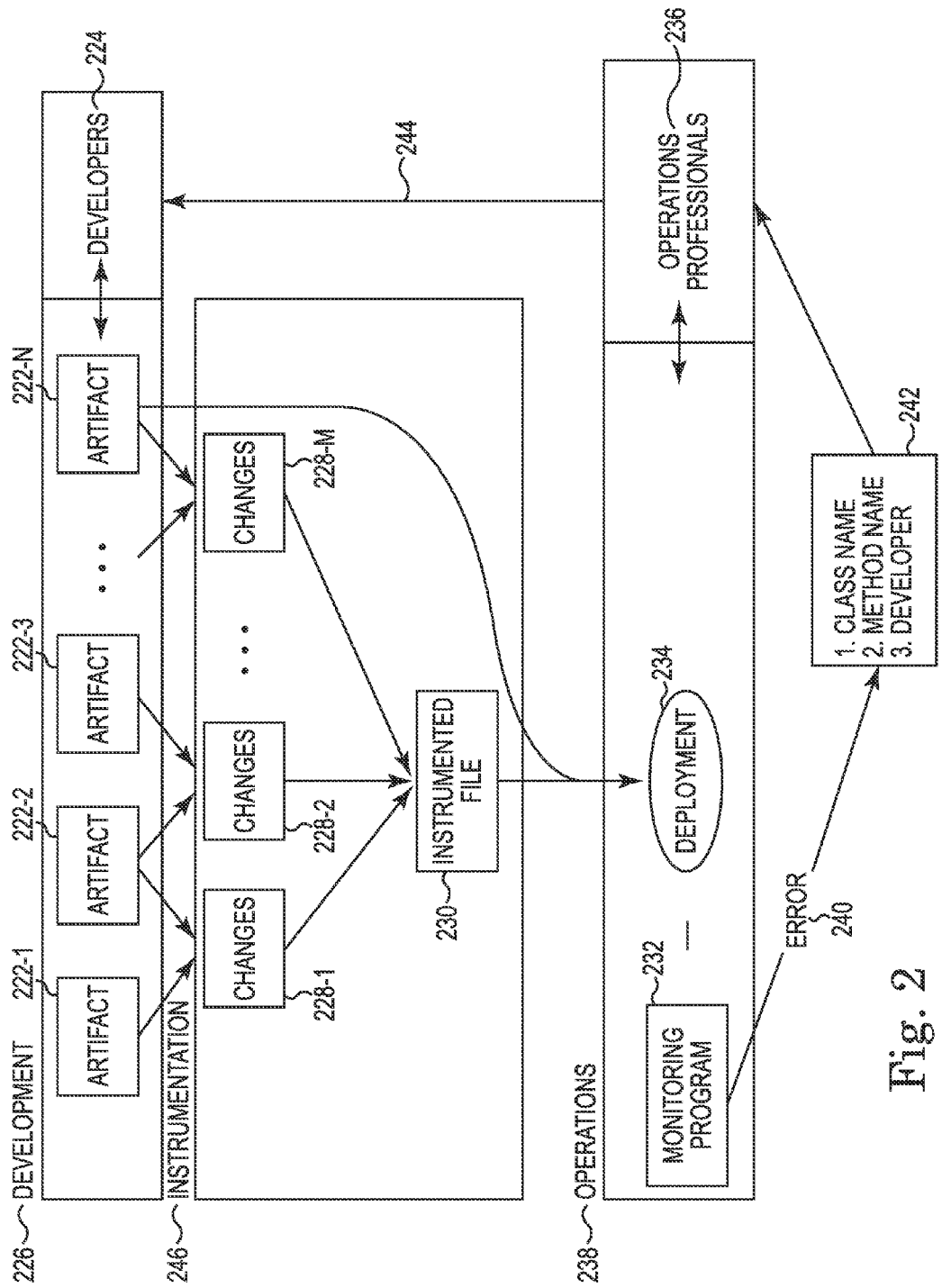
FIG. 2 is a diagram illustrating an example of instrumented file deployment according to the present disclosure.

FIG. 2 is a diagram illustrating an example of instrumented file deployment according to the present disclosure. FIG. 2 illustrates the development phase 226 of a number of artifacts 222-1, 222-2, 222-3, . . . , 222-N. e.g., referred to generally as artifacts 222, an instrumentation phase 246, and an operations phase 238.

In the development phase 226 a number of artifacts 222 can be developed by a number of developers 224. Each of the developers 224 can be associated with specific classes and/or methods in the number of artifacts 222. As described with respect to FIG. 1, the artifacts can be versions of a particular artifact. For example, a first artifact 222-1 can be a first version of the particular artifact. A second artifact 222-2 can be a second version of the particular artifact. A third artifact 222-3 can be a third version of the particular artifact. A latest artifact 222-N can be the latest version of the particular artifact.

An instrumentation phase 246 can include the analyzing of the number of artifacts 222 to determine a number of differences, e.g., changes, between the number of artifacts 222. The number of changes can include, for example, a first number of changes 228-1 between the first artifact 222-1 and the second artifact 222-2, a second number of changes 228-2 between the second artifact 222-2 and the third artifact 222-3, . . . , and a latest number of changes 228-M between a next to last artifact and the latest artifact 222-N. As used herein, the number of changes 228-1, 228-2, . . . , 228-N can be referred to generally as 228.

Each of the number of changes 228 can include a class name and/or a method name where the changes occurred. For example, if a second artifact 222-2 includes MRI, not found in the first artifact, under a first method in a first class, then the number of changes 228-1 can include a first class name associated with the first class and/or a first method name associated with the first method.

In the examples of FIG. 2, each of the number of changes 228 can be included in an instrumented file 230. The instrumented file 230 can be analogous to the instrumented file discussed above with respect to FIG. 1. That is, the instrumented file can contain a record of the number of changes 228 that occurred between a number of versions of the particular artifact. The number of changes 228 can be organized, e.g., formatted, in a format that can allow a monitoring program 232 to utilize the instrumented file 230.

In a number of examples of the present disclosure, only the latest changes 228-N are included in the instrumented file. For example, the instrumented file can include the class names and/or the method names included in the latest changes 228-N.

In a number of examples of the present disclosure, each of the number of changes can be included in separate instrumented files (not shown). For example, the first number of changes 228-1 can be included in a first instrumented file (not shown), the second number of changes 228-2 can be included in a second instrumented file (not shown), . . . and the latest number of changes 228-M can be included in a latest instrumented file (not shown).

An operations phase 238 can include the deployment and/or monitoring, e.g., referred to generally as deployment 234, of the latest artifact 222-N and/or the instrumented file 230. The deployment 234 can be supervised by a number of operations professionals 236.

Deployment can include, for example, testing. During deployment an error 240 can be identified by a monitoring program 232. The monitoring program 232 can generate a report 242 that can include a class name, a method name, and/or a developer, among others, that are associated with the MRI where the error occurred. The report can be sent to an operations professional 236. The operations professional 236 can send the report to a developer from the number of developers 224. Arrow 244 indicates the sending of the report 242 to a developer. In a number of examples of the present disclosure, a monitoring program 232 can send the report 242 directly to a developer (not shown).

As used herein, a monitoring program 232 can be a program that uses an instrumented file 230 and/or a number of instrumented files and a latest artifact 222-N to measure the performance of the execution of the latest artifact 222-N. The monitoring program 232 can also detect a number of errors that can occur during the execution of the latest artifact 222-N. The monitoring program 232 can generate a report 242 of the errors and can distribute the report 242 to an operations professional 236 and/or a developer 224.

Figure 3:
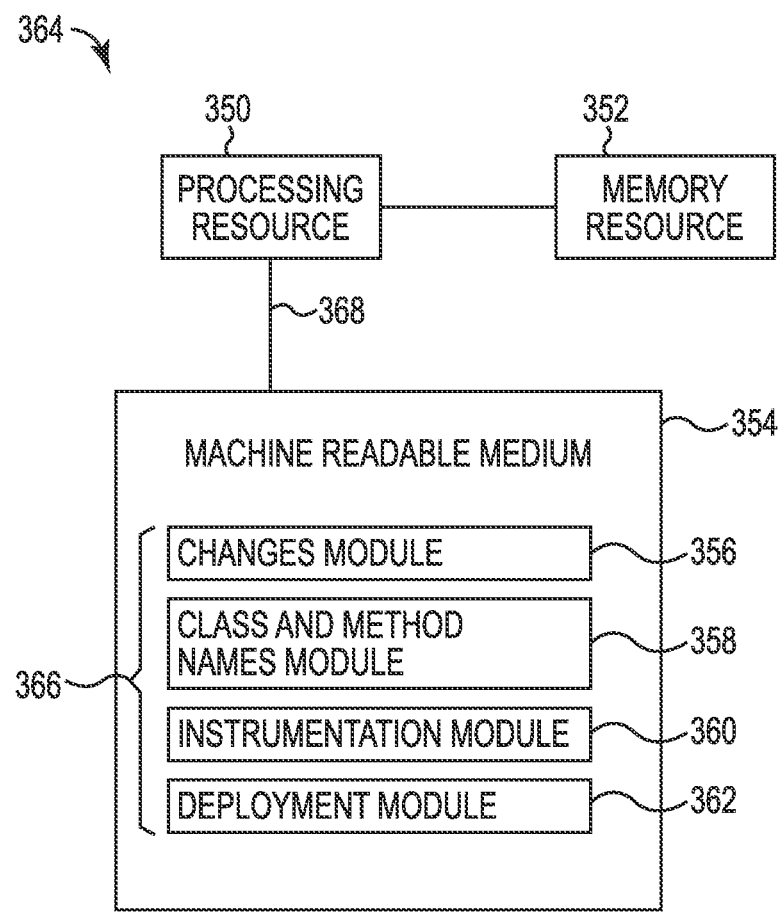
FIG. 3 illustrates an example of a computing system according to the present disclosure.

FIG. 3 illustrates an example of a computing system according to the present disclosure. The computing system 364 can utilize software, hardware, firmware, and/or logic to perform a number of functions.

The computing system 364 can be a combination of hardware and program instructions configured to perform a number of functions. The hardware, for example, can include one or more processing resources 350, machine readable medium (MRM) 354, memory resource 352, etc. The program instructions, e.g., machine-readable instructions (MRI) 366, can include instructions stored on the MRM 354 to implement a desired function, e.g., instrumented file deployment.

The processing resources 350 can be in communication with the tangible non-transitory MRM 354 storing the set of MRI 366 executable by one or more of the processing resources 350, as described herein. The MRI 366 can also be stored in remote memory managed by a server and represent an installation package that can be downloaded, installed and executed. The computing device 364 can include memory resources 352, and the processing resource 350 can be coupled to the memory resource 352.

Processing resource 350 can execute MRI 366 that can be stored on internal or external non-transitory MRM 354. The processing resource 350 can execute MRI 366 to perform various functions, including the functions described with respect to FIG. 1 and FIG. 2, among others.

The number of modules 356, 358, 360, and 362 can include MRI 366 that when executed by the processing resource 350 can perform a number of functions. The number of modules 356, 358, 360, and 362 can be sub-modules of other modules. For example, the changes module 356 and the class and method names module 358 can be sub-modules and/or contained within a single module. Furthermore, the number of modules 356, 358, 360, and 362 can comprise individual modules separate and distinct from one another.

A changes module 356 can comprise MRI 366 and can be executed by the processing resource 350 to extract a number of changes between a number of artifacts. The number of artifacts can include different version of a particular artifact. The number of artifacts can be stored in a database. The database can include a history of the development of the particular artifact. The database can include a record of the developers that performed the number of changes. The number of changes can be extracted from the database. The number of changes can include MRI that have been added, removed from the particular artifact. The number of changes can also include MRI that have been altered.

A class and method names module 358 can comprise MRI 366 and can be executed by the processing resource 350 to identify a number of class names and/or a number of method names that are associated with the number of changes. The identification can be made through the database and/or by referencing the number of artifacts.

An instrumentation module 360 can comprise MRI 366 and can be executed by the processing resource 350 to create an instrumented file that includes the identified class names and/or identified method names. The instrumented file can be used, in conjunction with a latest artifact, to monitor the performance of the execution of the latest artifact. The latest artifact can be a latest version of the particular artifact.

A deployment module 362 can comprise MRI 354 and can be executed by the processing resource 350 to deploy the instrumented file and the latest artifact. The deployment can include a testing configuration wherein the latest artifact is tested. The testing of an artifact can include the finding of a number of errors in the latest artifact. The deployment can include the deployment of the latest artifact to a consumer. The deployment can include the deployment to an operations professional. Upon the discovery of an error in the latest artifact, a report can be generated. The report can include a class name, method name, and/or developer identification that are associated with the MRI that caused the error.

A non-transitory MRM 354, as used herein, can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory MRM 354 can be integral or communicatively coupled to a computing device in a wired and/or wireless manner. For example, the non-transitory MRM 354 can be an internal memory, a portable memory, and a portable disk, or a memory associated with another computing resource, e.g., enabling MRIs 366 to be transferred and/or executed across a network such as the Internet.

The MRM 354 can be in communication with the processing resource 350 via a communication path 368. The communication path 368 can be local or remote to a machine, e.g., a computer, associated with the processing resource 350. Examples of a local communication path 368 can include an electronic bus internal to a machine, e.g., a computer, where the MRM 354 is one of volatile, non-volatile, fixed, and/or removable storage medium in communication with the processing resource 350 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 368 can be such that the MRM 354 is remote from a processing resource, e.g., processing resource 350, such as in a network connection between the MRM 354 and the processing resource, e.g., processing resource 350. That is, the communication path 368 can be a network connection. Examples of such a network connection can include local area network (LAN), wide area network (WAN), personal area network (PAN), and the Internet, among others. In such examples, the MRM 354 can be associated with a first computing device and the processing resource 350 can be associated with a second computing device, e.g., a Java® server. For example, a processing resource 350 can be in communication with a MRM 354, wherein the MRM 354 includes a set of instructions and wherein the processing resource 350 is designed to carry out the set of instructions.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method for instrumented file deployment comprising:
   identifying a number of changes between a first artifact and a second artifact;
   identifying a number of class names and a number of method names within the second artifact where the changes reside;
   creating an instrumented file from the identified number of class names and the identified number of method names; and
   deploying the second artifact and the instrumented file together.

2. The method of claim 1, wherein the first artifact and the second artifact that are written in a runtime programming language.

3. The method of claim 1, wherein deploying the second artifact and the instrumented file further includes tracking a performance of the number of changes through the second artifact and the instrumented file.

4. The method of claim 3, wherein tracking the performance of the number of changes through the second artifact and the instrumented file further includes associating the performance of the number of changes with a number of developers.

5. The method of claim 3, wherein tracking the performance of the number of changes through the second artifact and the instrumented file further includes determining when an error has occurred through the tracking of the performance of the number of changes.

6. The method of claim 5, wherein tracking the performance of the number of changes through the second artifact and the instrumented file further includes upon an determination that the error has occurred, providing a developer, a class, and a method that is associated with the error to an information technology (IT) professional, wherein the IT professional is not a developer.

7. A non-transitory machine-readable medium storing instructions for instrumented file deployment executable by a computer to cause the computer to:
   identify a number of changes between a plurality of artifacts;
   identify a number of class names and a number of method names within the plurality of artifacts where the changes took place;
   create an instrumented file from the identified number of class names and the identified number of method names;
   deploy a last artifact from the plurality of artifacts and the instrumented file; and
   detect an error in the last artifact by monitoring the last artifact and the instrumented file.

8. The medium of claim 7, wherein the plurality of artifacts represent a plurality of versions of a particular artifact.

9. The medium of claim 8, wherein the last artifact is a latest version of the particular artifact.

10. The medium of claim 7, wherein the instructions executable to identify the number of changes between the plurality of artifacts include instructions executable to identify the number of changes between succeeding versions of the plurality of artifacts.

11. The medium of claim 9, wherein the instructions executable to create the instrumented file from the identified number of class names and the identified number of method names includes instructions executable to organize the number of identified class names and the number of identified method names to correspond with the number of succeeding version of the plurality of artifacts.

12. A system for instrumented file deployment, comprising:
- a processing resource comprising a processor in communication with a memory resource comprising a memory, wherein the memory includes a set of instructions, and wherein the processor is designed to execute the set of instructions to:
- identify a number of changes between a plurality of artifacts that are a plurality of versions of a particular artifact;
- identify a number of class names and a number of method names within the plurality of artifacts where the changes took place;
- create a number of instrumented files from the identified number of class names and the identified number of method names;
- deploy a last artifact from the plurality of artifacts and the number of instrumented files wherein the last artifact is a latest version of the particular artifact; and
- track a performance of the number of changes through the last artifact and the number of instrumented files and correlate the performance with a number of developers.

13. The system of claim 12, wherein the instructions executable to track the performance of the number of changes includes instructions executable to associate the number of developers with the identified number of class names and the identified number of method names and associate the performance of the number of changes in the identified number of class names and the identified number of method names with a number of individual developers.

14. The system of claim 13, wherein the instructions are further executable to associate the performance of the number of changes in the identified number of class names and the identified number of method names with an evaluation of the number of individual developers.

15. The system of claim 12, wherein the instructions executable to create the number of instrumented files from the identified number of class names and the identified number of method names includes instructions executable to include in each of the number of instrumented files the identified number of class names and the identified number of method names of the number of changes between a succeeding version of a particular artifact.

16. The system of claim 12, wherein the instructions are further executable to store the number of changes between the plurality of artifacts as metadata in the plurality of artifacts.

17. The system of claim 16, wherein the instructions executable to identify the number of changes between the plurality of artifacts include instructions executable to compare metadata associated with each of the plurality of artifacts with the metadata associated with a different artifact from the plurality of artifacts.

18. They system of claim 12, wherein the instructions executable to track the performance of the number of changes include instructions to evaluate the performance of the number of developers as it relates to the development of the plurality of artifacts.

19. The system of claim 12, wherein the instructions are further executable to generate a number of reports for the number of developers, wherein the number of reports can include a number of faults, the number of class names, the number of method names, and a number of responsible developers that are responsible for the number of classes and a number of methods.

20. They system of claim 12, wherein the instructions executable to create the number of instrumented files from the identified number of class names and the identified number of method names include instructions to create an instrumented file from the number of instrumented files for each of the number of changes between versions of the plurality of artifacts.

* * * * *